United States Patent [19]
Gayler et al.

[11] Patent Number: 4,995,358
[45] Date of Patent: Feb. 26, 1991

[54] INTERNAL COMBUSTION ENGINES

[75] Inventors: Robert J. Gayler; Timothy M. Lancefield, both of Ashford, England

[73] Assignee: Piper-Mechadyne Limited, Oxfordshire, England

[21] Appl. No.: 469,439

[22] PCT Filed: Oct. 21, 1988

[86] PCT No.: PCT/GB88/00914
§ 371 Date: Apr. 11, 1990
§ 102(e) Date: Apr. 11, 1990

[87] PCT Pub. No.: WO89/03932
PCT Pub. Date: May 5, 1989

[30] Foreign Application Priority Data

Oct. 23, 1987 [GB] United Kingdom ................. 8724872

[51] Int. Cl.[5] .............................................. F01L 3/00
[52] U.S. Cl. ........................ 123/188 M; 123/197 AC; 123/90.43
[58] Field of Search .... 123/188 M, 197 AC, 197 AB, 123/40.43

[56] References Cited

U.S. PATENT DOCUMENTS 287,284 7/1939 Schmidt .......................... 123/188 M
1,898,119 2/1933 Edwards ......................... 123/188 M

FOREIGN PATENT DOCUMENTS

1601379 5/1970 Fed. Rep. of Germany ... 123/188 M
1030808 6/1953 France .
1474986 3/1967 France .
86/02976 5/1986 World Int. Prop. O. .

Primary Examiner—E. Rollins Cross
Attorney, Agent, or Firm—Dennison, Meserole, Pollack & Scheiner

[57] ABSTRACT

A dual duct porting system comprises a pair of juxtaposed bent, side entry supply ducts (14, 15) merging into a single supply passage (16) encircling a valve stem (13). Each supply duct (14, 15) has eddy creating means (20) provided at a radially inner region of the duct bend and an outwardly bulging portion (21) at a radially outer region of the duct bend to provide a flow in the merged passage (16) which is more evenly spread around the valve head to be shed therefrom as evenly distributed toroidal vortices.

8 Claims, 7 Drawing Sheets

INTERNAL COMBUSTION ENGINES

This invention relates to internal combustion engines, and, more particularly, to inlet porting systems thereof.

In conventional engines, whether one or two inlet valves are provided and even at the present state of the art efficiency, the inlet airflow is required to turn through between 120° and 160° tending to concentrate the flow on one side of the valve head and is further impeded by the valve stem and its guide. The result is that only an average of 200° of the periphery of the valve head is able to pass efficiently the incoming fuel laden air.

GB-A-371,211 describes a cylinder porting system comprising a pair of outer gas supply ducts which merge into a single inner supply duct that encircles the stem of a poppet valve controlling a cylinder port to provide a gas stream which is parallel to the axis of the valve stem. Such a system is hereinafter referred to as "a dual duct porting system". This system provides an improved volumetric efficiency over a single gas supply duct; it is at least comparable with a twin inlet valve system and has other technical advantages thereover, e.g. easier production since the valve operating mechanism is only required for one valve rather than a pair of valves. Ideally, it is desired to have the gas stream distributed around the entire periphery of the valve head so that eddies of gas are shed into the combustion chamber from all around the valve head periphery which provides a particularly effective preparation of the combustible fuel mixture which is evenly spread around the valve head. This is known as torroidal vortex induction and can only be achieved effectively by a dual or multiple duct portion system.

However when applying such a porting system to a cylinder head where side entry into the pair of outer supply ducts is required, the individual streams in the respective outer supply ducts, which are bent for the side entry, tend to break away from the insides of the bends and flow towards the outside portions of the bends and thereafter form a merged stream which is distributed over about 200° of the periphery of the valve head. This prevents the formation of an evenly distributed torroidal vortex shed from the valve head into the combustion chamber.

The object of the invention is to provide a dual duct porting system adapted for side entry in which the gas flow therethrough is such as to provide a relatively evenly distributed flow over the associated valve head.

The invention provides a dual duct porting system for an internal combustion engine, which system comprises a pair of juxtaposed bent, side entry supply ducts which merge into a single supply passage formed to define a venturi section and communicating with a valve port with the single supply passage surrounding the stem of a poppet valve associated with the valve port, wherein each bent side entry supply duct is provided with means for creating eddies in the gas flow at a specific position along the radially inner region of the duct bend and an outwardly bulging portion at a radially outer region of the duct bend.

In use, the eddy creating means produce a controlled breakaway of the boundary layer of the gas flow on the inside of the duct bend to produce a low pressure region which, together with the direction of swirl of the eddies, tends to pull the gas flow, in a controlled manner, back into contact with the radially inner wall of the duct, while the outward bulging on the outside of the duct bend tends to turn back the gas flow in that region. The combination of these effects tends to straighten the gas flow in the respective duct downstream of the bend therein so that it is nearer to an evenly distributed axial flow in that downstream section of the duct. In this way the gas streams issuing from outer supply ducts merge to form a stream flowing generally axially through the single supply passage to spread substantially evenly over the poppet valve head and to shed therefrom as evenly distributed torroidal vortices.

Said eddy creating means may take various forms. For example such means may comprise an internally undercut portion formed in the wall of the respective supply duct at or after the bend therein. In other embodiments, such means may comprise an inwardly projecting edge formed on the wall of the duct at the inner side of the bend therein. Instead of an edge, a discontinuous series of edges or other inward projections adapted to create a controlled boundary layer breakaway may be employed as the eddy creating means.

Preferably but not essentially the cross-sectional areas of the pair of said supply ducts progressively decrease in the direction towards their point of merger to cause an acceleration in the gas flows therethrough.

In some embodiments, means may be provided in at least one of said supply ducts to control the flow therethrough, allowing, e.g. deactivation of one supply duct during lighter loading operation.

A dual duct porting system according to the invention may advantageously be used in an internal combustion engine having a mechanism that allows the valve lift to be varied to suit the requirements of an ideal combustion cycle for the various operating loads and speeds. Although such adjustments normally reduce engine performance, such a system is viable in an engine having a porting system according to the invention because of the extra performance produced thereby. It also keeps the gas velocities high at lower engine speeds. Gas velocities are important in connection with the "strength" of the torroidal vortices, thereby aiding low speed performance and economy.

Furthermore a dual duct porting system according to the invention may be used in an internal combustion engine having a mechanism for producing piston dwell after top dead centre. This dwell allows burning at a more constant volume than in conventional engines to improve the thermal efficiency of the engine. This effect is enhanced in engines having an inlet porting system according to the invention because the torroidal vortex induction is less prone to knocking as a result of superior mixture preparation.

Embodiments of the invention will now be described by way of example and with reference to the accompanying drawings, in which.

Figure 1:
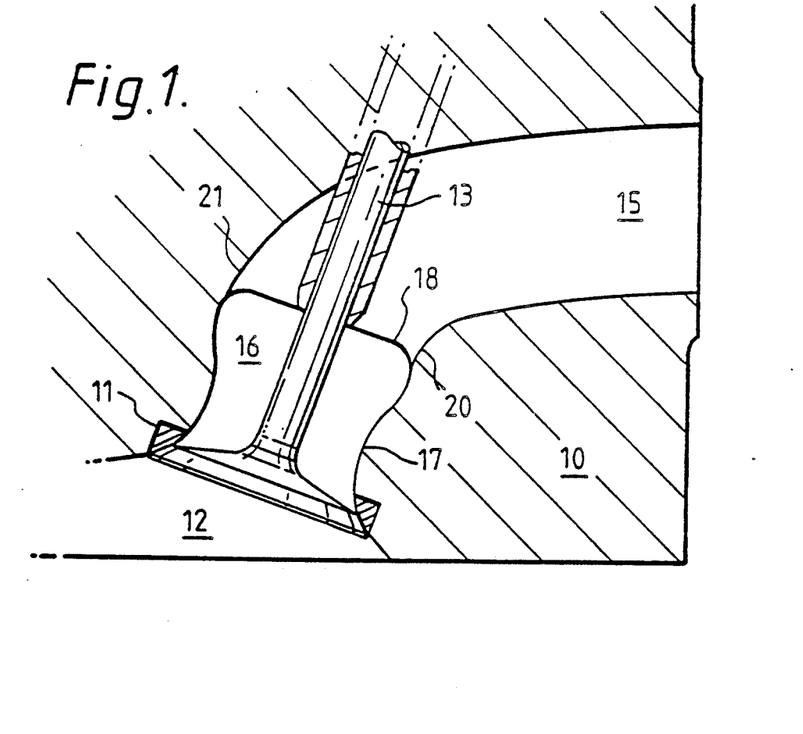
FIG. 1 is a diagrammatic cross-sectional representation of a first embodiment of an inlet porting system according to the invention.
Figure 2:
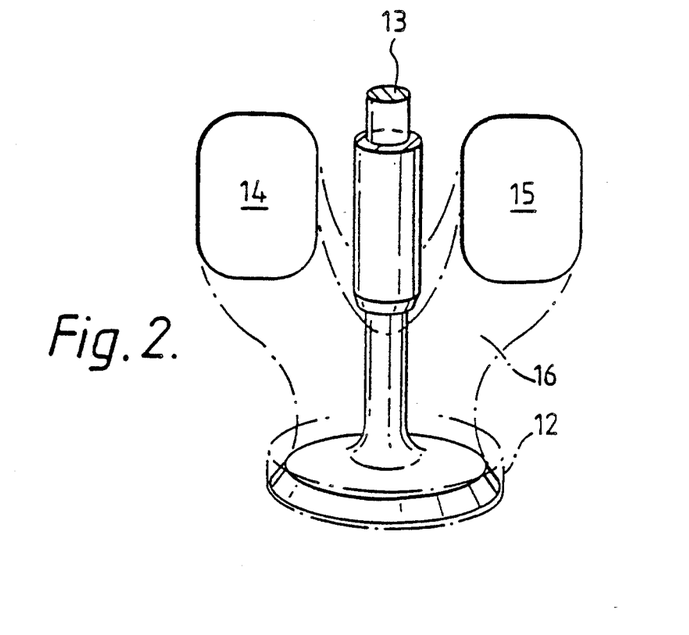
FIG. 2 is a diagrammatic end view of the porting system of FIG. 1.

Referring to FIGS. 1 and 2, a cylinder head (10) is formed with an inlet port (11) into its combustion chamber (12) which is controlled by an axially slidable poppet valve (13) operated by any conventional valve mechanism. The cylinder head 10 is formed with a side entry inlet porting comprising a branched pair of supply ducts (14,15) which are bent along their length to allow for a side entry air or fuel mixture supply to the cylinder head.

The supply ducts (14,15) extend generally in a side-by-side relationship from a side face to the cylinder head but are branched towards one another immediately after the bends in the ducts so as to merge into a single supply passage (16) which communicates with the valve port (11). The supply passage (16) extends axially and encircles the stem of the valve (13) and is formed with a venturi (17) immediately upstream of the valve head. In this embodiment, the supply ducts (14,15) have a generally oblong cross-section with rounded corners and the cross-sectional areas of the duct decrease in the direction towards their point of merger in order to generate the correct pressure distribution within the ducts for control of the gas boundary layer therein. The supply ducts (14,15) blend smoothly together at their point of merger where the ducts have a D-shaped cross-section at (18), in order to provide, immediately downstream thereof, a circular cross-section of the merged supply passage (16) symmetrically encircling the valve stem (13).

Figure 8:
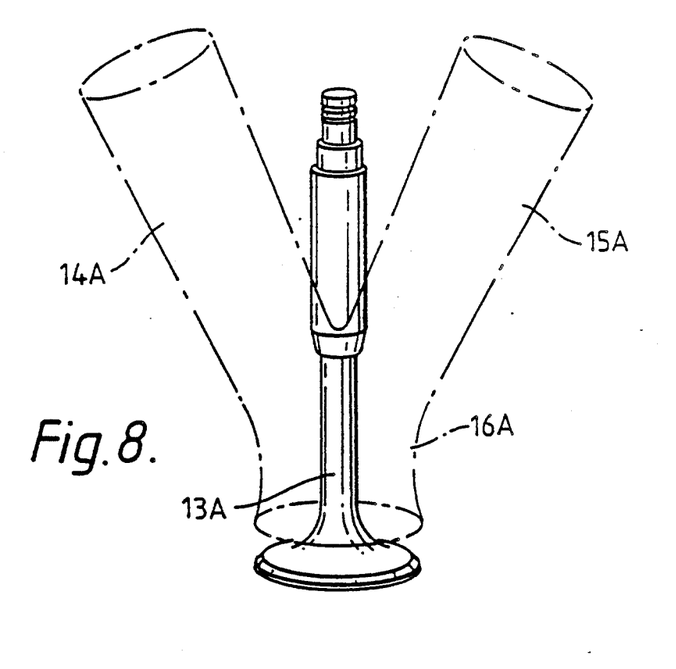
FIG. 8 is a diagrammatic side view of a further dual duct porting system.

Referring now to FIG. 8, there is shown a bifurcated porting system in which the branched supply ducts (14A,15A) are generally straight along their lengths and merge into a single supply venturi section (16A) immediately behind the valve head of the valve (13A). This system provides two gas flow streams which merge into a single stream in the venturi (16A). The merged stream flows generally axially around the valve stem as an evenly distributed encircling flow which passes smoothly over the valve head and is evenly distributed thereover. As a result of this smooth flow over the entire valve head, eddies are shed from the entire circumference of the valve head producing a series of torroidal vortices immediately below the valve which are in turn projected into the cylinder in a state of high turbulence. This type of flow has a number of advantages. The essentially non-rotating an stable nature of the flow distribution allows for fuel added to the air flow duct to remain in that half of the combustion chamber. The flow can therefore be positioned advantageously adjacent to the spark plug, giving the possibility of non-homogeneous or stratified charge effects to allow the burning of very lean air fuel ratios. The torroidal vortex shedding of the flow also produces very finely atomised fuel particles leading to a very fast burning mixture even at lean air fuel ratios. The very fast burn rate generated thereby leads to a reduced requirement for ignition advance and improved knock tolerance. Moreover the utilization of the entire valve head periphery gives exceptionally high volumetric efficiencies which allows either higher specific outputs to be generated or, by changing the inlet valve sizes or adjusting valve lifts or both, allows an advantageous increase in the air velocities past the valve to improve still further the fuel preparation for burning. Furthermore by differential control of the ports and/or angular or asymmetrical location of the ducts, swirling can be induced in the flows introduced into the combustion chamber.

This concentric axial flow can be achieved with the arrangement shown in FIG. 8. However a problem arises when this principle is applied to a side entry valve porting system as illustrated in FIGS. 1 and 2. Referring to FIGS. 1 and 2, the gas flows through bent dual supply ducts (14,15) leads to a concentration of the supplied gas in the merged streams thereof in supply passage (16), over one half of the periphery of the valve head. The reason for this is detachment of the flow in the ducts (14,15) around the inside of the bent section thereof tending to provide a concentration of the gas flow issuing from these ducts into the common supply passage (16) at the areas on the outside of the bent portions thereof. Therefore the desired annular, axially flowing gas stream in the venturi (17) is not achieved so that vortex shedding takes place from only a part of the periphery of the valve head.

The Applicants have discovered that an improved flow from this side entry porting arrangement can be achieved by the following constructional features which act to re-attach the flow which has broken away form the inside of the bend in the ducts (14,15) and also act to straighten the flow on the outside of the bends. At the inside of the bend, means are provided to cause a controlled breakaway of the boundary layer at the inside of the bend and create eddies thereat which generate a low pressure region which, together with the swirling direction of the eddies, tends to pull the gas stream back into contact with the wall of the ducting at the inner side of the bends therein. In the embodiment shown in FIG. 1, such means are provided by an undercut area (20) formed at the inner side of the bends in the ducts (14,15) which promote a controlled breakaway producing eddies swirling into the undercut area. The low pressure region created in this undercut area tends to draw the gas stream back into contact with the wall of the ducting at this region.

The ducts (14,15) are also formed with outwardly bulging areas (21) on the outside of the bends therein towards the exit end of such bends. It has been found that such bulging or bowling provides an area for receiving the gas flow on the outer side of the bend sin the ducts and assists in straightening such flow with respect to the axis of the valve (13) so as to promote straightened flows of gas on the outside of the bends which merge for passage through the venturi (17) prior entry into the combustion chamber (12). It has been found that the effects of the eddy creating means (20) and the outward bulging (21) assist in producing a merged stream in the gas passage (16) which is more evenly distributed around the axis of the valve (13) so that vortex shedding from around substantially the entire periphery of the valve head can be achieved.

Figure 3:
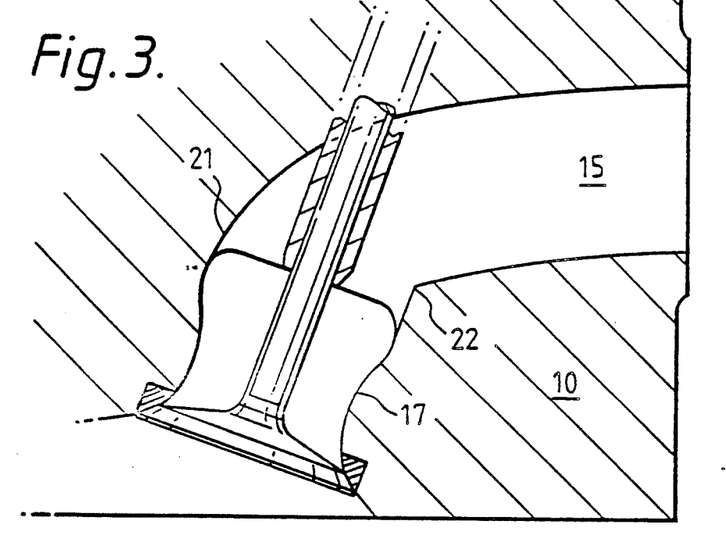
FIG. 3 is a diagrammatic cross-sectional representation of a second embodiment.

FIG. 3 shows another embodiment which is generally similar to the embodiment of FIGS. 1 and 2 except that the undercut area (20) at the inside of the bend of the embodiment in FIG. 1 is replaced by a sharp edge (22) formed at the inner side of the bends in the ducts (14,15). The sharp edge (22) similarly produces a controlled breakaway of the boundary layer at the inside of the bend and creates eddies thereat which generate a low pressure region for effecting re-attachment of the boundary layer before the venturi (17).

Figure 4:
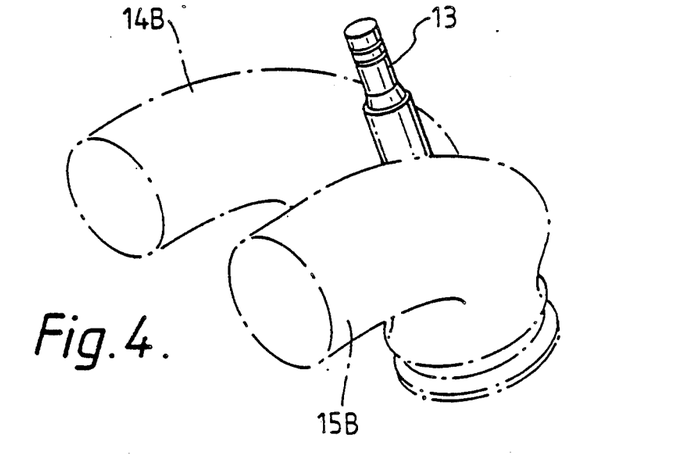
FIG. 4 is a diagrammatic perspective representation of a third embodiment of an inlet porting system according to the invention.

The embodiment shown in FIG. 4 is generally similar to that shown in FIG. 1 except that the ducts (14B,15B) are of circular cross-section instead of the generally oblong cross-section of the first embodiment.

Figure 5:
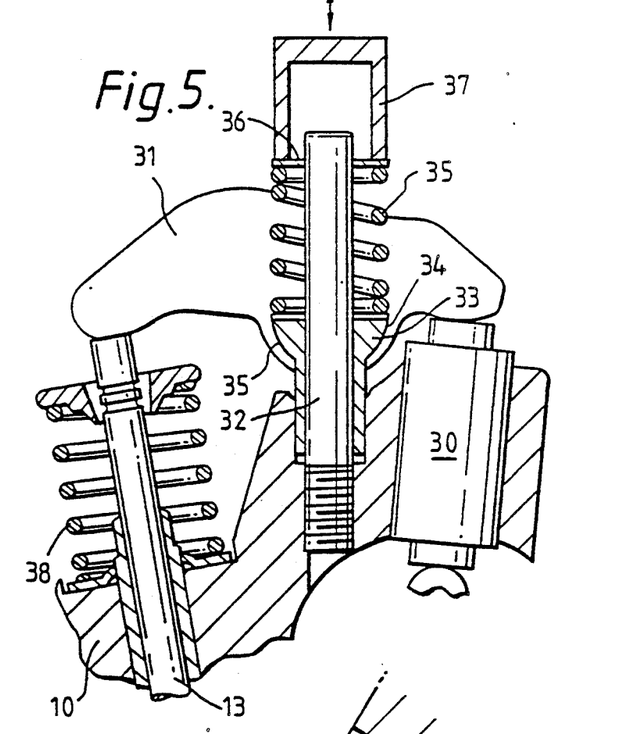
FIG. 5 is a diagrammatic cross-sectional representation of a variable valve lift mechanism.

FIG. 5 illustrates a variable valve lift mechanism for operating a valve (13) of any of the dual inlet porting system described above. The mechanism allows the valve lift to be varied to suit the requirements of an ideal combustion cycle. The mechanism comprises a cam follower (30) and a rocker for transmitting movement of the cam follower to the valve (13). A stud (32) is fixed in the cylinder head (10) to project therefrom. A rocker retaining pivot (33) is slidably mounted on the stud (32) and has a downwardly facing hemispherical seating surface (34) for cooperation with a similarly shaped seating surface (35) formed in the body of the rocker (31). A biassing compression spring (35) acts between the upper surface of the rocker retaining pivot (33) and an annular disc (36) slidably mounted on a projecting part of the stud (32). A cup-shaped control plunger (37) is engaged with the upper surface of the disc (36) to act thereon in accordance with axial forces applied thereto. As the plunger (37) is adjusted either upwardly or downwardly, the load in the spring (35) is varied. As the load in the spring (35) is reduced relative to the load in the valve closing spring (38), part of the cam lift motion is absorbed as motion in the assembly of the rocker (31) and retaining (33) which move upwardly along the stud (32). In this way, the valve lift can be varied according to the position of the plunger (37).

In other embodiments, the spring (35) can be replaced by a hydro-mechanical assembly which can enable adjustment of the valve lift as well as allowing for hydraulic lash adjustment. Such an arrangement would allow for variation of the valve lift in accordance with a change of pressure in an hydraulic servo system. Such a variable valve lift system could allow the range of adjustment of the system to be such that intake valve lift throttling can also be achieved. Furthermore variable valve timing can be achieved whereby a period the valve is opened can be varied by movement of the plunger (37) during the valve opening and closing cycle by differing amounts and times and closing cycle.

Variable valve lift in accordance with inlet porting systems as described above in relation to FIGS. 1 to 4 and 8 which achieve torroidal vortex shedding around the periphery of the valve head can be particularly advantageous in achieving an optimum combustion cycle. Variable valve lift with conventional porting systems can lead to an unacceptable reduction in performance. However this is not detrimental to dual duct porting systems as illustrated in the accompanying drawings because of the superior volumetric efficiency thereof.

Figure 6:
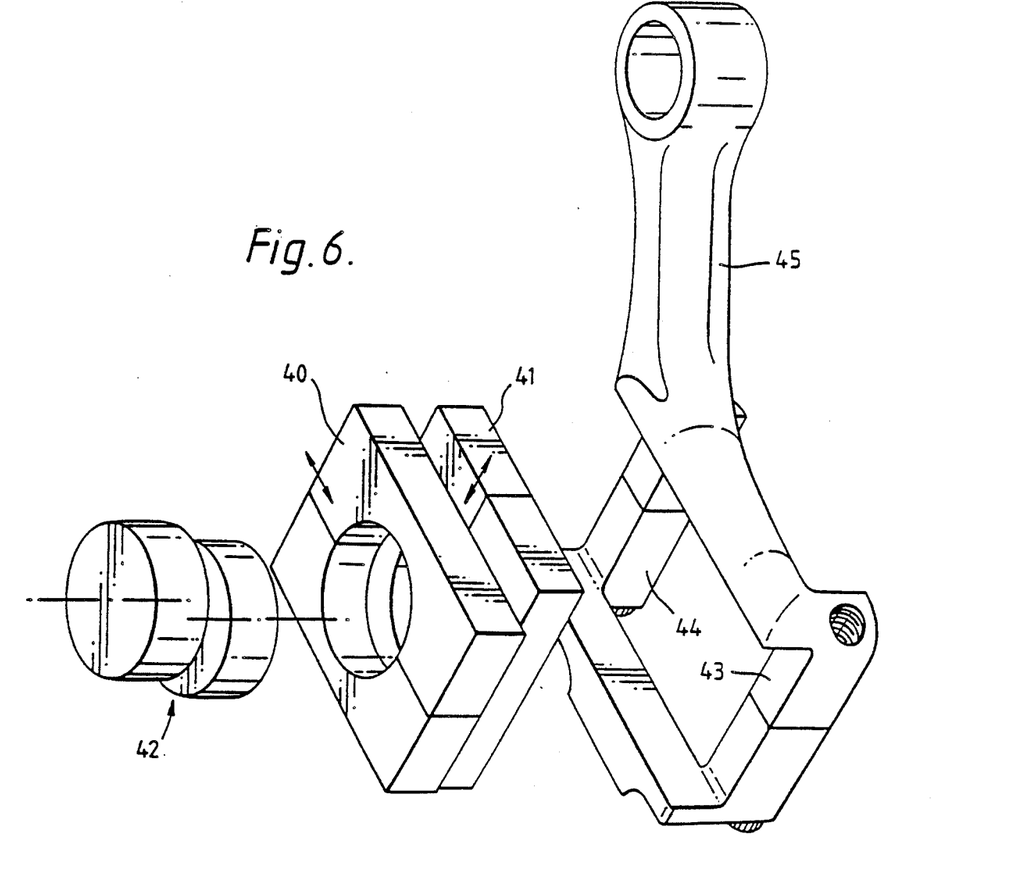
FIg. 6 is a diagrammatic perspective and exploded representation of a piston rod mechanism adapted to produce piston dwell at T.D.C.

FIG. 6 illustrates a piston valve connecting rod system which can also be applied to an internal combustion engine having a dual duct induction porting system as described above. The faster burning and improved knock tolerance of the mixture preparation of such an induction system is compatible with the use of piston dwell after T.D.C. allowing burning at a more constant volume than in conventional engines, which improves the thermal efficiency of the engine.

The mechanism in FIG. 6 can allow a dwell after T.D.C. and also B.D.C. The mechanism comprises two blocks (40,41) which are mounted on a double crank pin (42) blocks are located in respective slide channels (43,44) formed at the lower end of a connecting rod (45) so that the blocks slide in mutually perpendicular directions. As the double crank pin (42) rotates inside the blocks, a roughly elliptical locus of the connecting rod big end is generated instead of the normal circular locus. By appropriate configuration of the double crank pin (42), the dwells in the motion of the piston may be positioned before or after T.D.C. and B.D.C.

Figure 7:
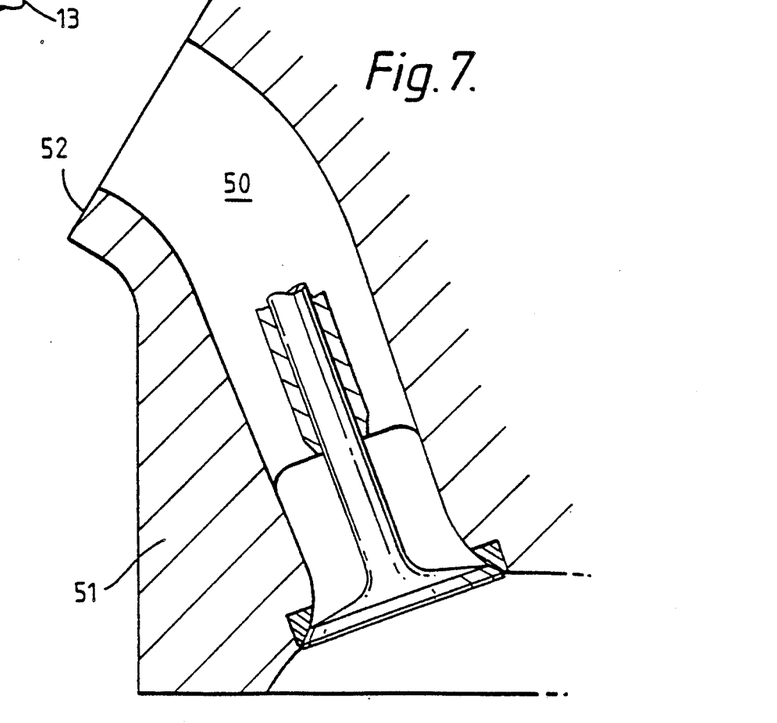
FIG. 7 is a diagrammatic side view of another dual duct porting system.

FIG. 7 illustrates another configuration of a dual duct inlet system similar to that shown in FIG. 8 except that the ducts (50) towards their inlet ends are slightly turned to communicate with a slanting face (52) of the cylinder head (51).

Dual duct inlet porting systems according to the invention can be adapted an operated to effect either differential throttling or differential fuel.

DIFFERENTIAL THROTTLING

It is common practice on 4 valve per cylinder engines (with separate inlet ports) to use port deactivation, at low engine speeds and light loads to increase the mixture velocity and hence enhance the part load economy of such engines. Port deactivation is normally effected by placing an auxiliary butterfly valve close to the inlet port face of the head. These butterflies are operated either by manifold vacuum or the engine management system.

Such a system can advantageously be applied to a dual duct inlet porting system according to the invention again producing higher mixture velocities. However in this case the benefits are achieved without the extra expense of a second inlet valve. The flow regime also changes to produce a more complete torroidal vortex structure with it superior mixture preparation.

DIFFERENTIAL FUELLING

Normal induction ports produce complex gas flow patterns in the combustion chamber and cylinder. These flow regimes contain rotary motions about either one or both of the axes of the cylinder or axes perpendicular thereto. The intensity of these swirling motions is a function of engine speed. Thus if a non-homogeneous mixture is induced, there is uncertainty about the position of the burnable portion of the mixture, in relation to the spark plug, at the time of ignition. So a homgeneous mixture is required by normal induction ports.

The production and burning of non-homogeneous or stratified mixtures allows the engine to burn leaner overall air fuel ratios than can be burnt if the mixture is homogeneous. This is advantageous in improving the part load fuel economy of engines.

A dual port induction system according to the invention produces an essentially non-rotating flow regime that is sensibly stationary relative to the spark plug. In addition the axi-symmetry of the twin inlet ducts means that little mixing takes place between the air streams from each of the ducts after their junction. These features allows the fuel to be advantageously introduced into only one of the ducts. The duct that positions the fuel rich mixture adjacent to the spark plug being chosen. Thus the two duct is capable of producing stratified fuel distribution with the above-mentioned benefits.

The Applicants have carried out tests in respect of performance of a dual duct inlet system in accordance with the invention as compared with a similar system which does not incorporate the aforesaid eddy creating means and outward bulging at the bent portions of the ducts. The details and dimensions of the porting systems which were tested are as follows:

Test 1

(FIG. 9) A conventional induction porting system having a single side entry inlet duct, wherein:
Diameter of inlet duct—34 mm
Length of inlet duct—100 mm
Radius of bend in duct—50 mm
Diameter of valve seat—40.5 mm

Test 2

(FIG. 10) A dual duct porting system, wherein:
Diameter of inlet ducts—31.6 mm
Length of inlet ducts—115 mm
Radius of bends in ducts—50 mm
Diameter of valve seat—40.5 mm
Diameter of venturi throat—30 mm
Length of merged duct section—32 mm

Test 3

(FIG. 11) A dual duct porting system which is the same as for Test 2 except that there is provided in each inlet duct an outward bowling having a depth of 5 mm, and a length 25 mm.

Test 4

(FIG. 12) A dual duct porting system which is the same as for Test 3 except that each inlet duct is additionally formed with an undercut eddy creating region having a depth of 5 mm, and a length of 15 mm.

Test 5

(FIG. 13) A dual duct porting system which is the same as for Test 4 except that flow through one inlet duct is blocked off.

Figure 14:
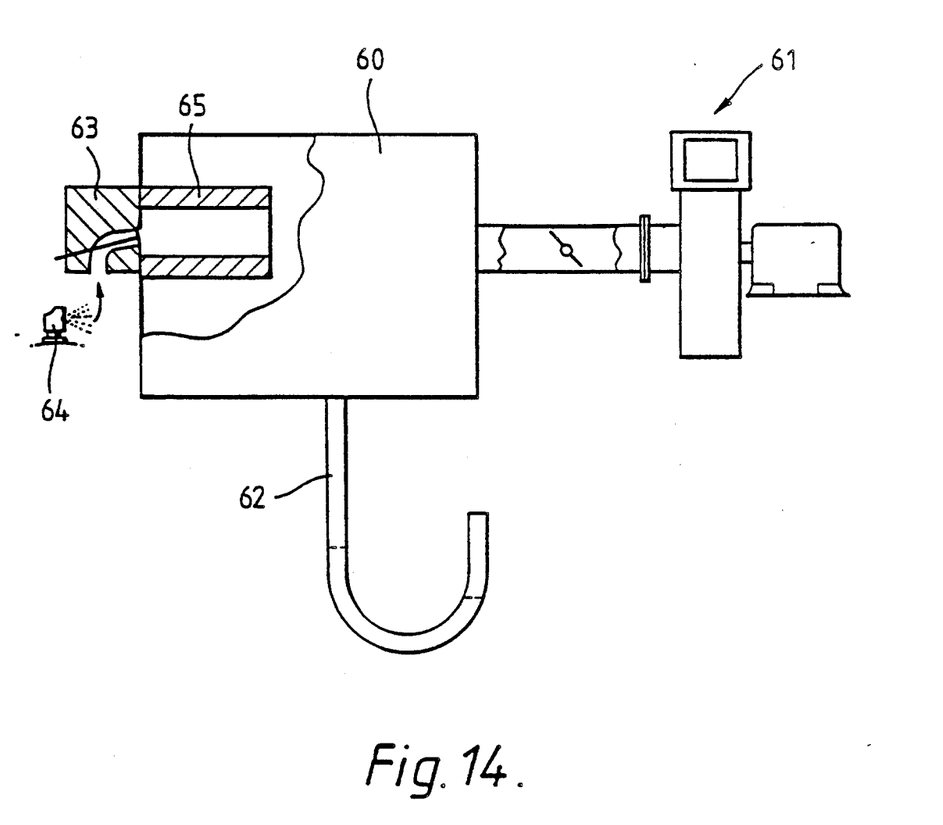
FIG. 14 is a diagrammatic representation of a test apparatus for testing models of different ducting systems.

The experiments carried out in these Tests 1–5 utilized as apparatus as illustrated in FIG. 14. The apparatus comprises a large volume chamber (60) having a throttle controlled extraction fan system (61) connected thereto. A water manometer (62) registers the vacuum produced in the chamber (60) in operation. A module (63) is fitted to an outside wall of the chamber (60) and provides a model of a duct porting system, including a poppet valve, to be tested. The module (63) is replaced by other modules providing models of other duct porting systems as required for the series of Tests 1-5. The valve port formed on the module (63) communicates an appropriately sized cylinder (65) located inside the chamber (60). An aerosol (64) is used to introduce spray particles into the entry end or ends of the single or dual inlet ducts formed in the respective modules (63).

During testing, a timed burst of spray from the aerosol (63) is made to introduce into the supply duct or ducts a suitable material, e.g. a crack detection developer which is light and thus able to follow the streamlines of the air flow in the ducts(s) reasonably accurately. The sprayed medium collects on the back of the valve head and the colour density is an indicator of the flow distribution thereover.

The air flows through the port at a predetermined pressure difference across the port, this value being maintained for all the above-mentioned tests. The air flow is controlled by the throttle provided in the extraction fan system (61).

The distribution of this flow passing over the valve head for Tests 1-5 is diagrammatically illustrated in FIGS. 9-13 respectively. The flow distribution over the valve head in those FIGS. is illustrated by a dot notation and also expressed in percentage terms for each quadrant of the valve head. In Test 1, the flow is at 80% volumetric efficiency. In tests 2-4 which relate to dual duct porting systems, the total flow exceeds 100% because the datum for the calculation is taken as being the theoretical maximum flow possible in conventional single duct inlet porting systems based on values calculated from RICARDO flow coefficients.

Figure 9:
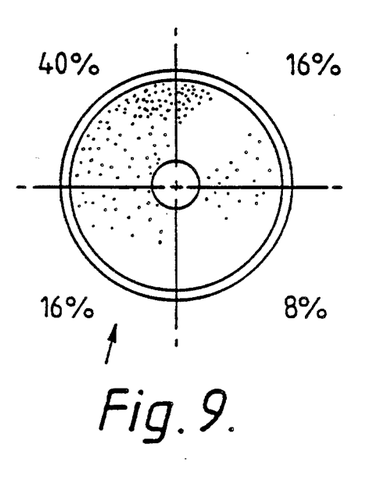
FIGS. 9-13 illustrate diagrammatically flow distribution over a valve head according to respective tests carried out on induction valve porting systems.

It will be seen in FIG. 9 using a conventional single duct porting system, that the valve stem inhibits flow in the upper, right quadrant of this FIG. and that little or no flow takes place in the lower section of the FIG. This is caused by the flow through the duct bend being concentrated radially outer regions of the duct bend.

Figure 10:
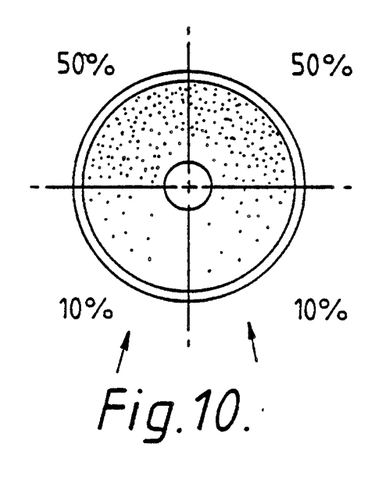

FIG. 10 shows a flow distribution which overcomes masking by the valve stem by utilizing a dual duct porting system. However the effect of the bends in the ducts is not overcome.

Figure 11:
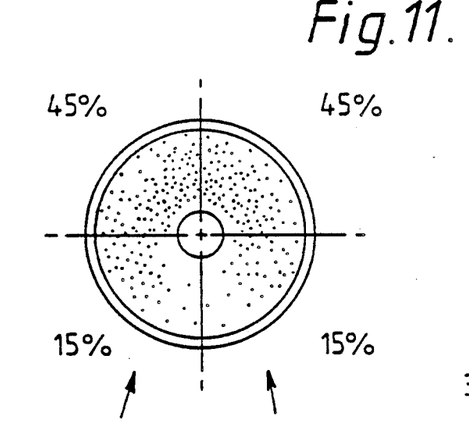

FIG. 11 shows an improvement in the distribution of the air flow over the entire valve head but still with a bias towards one side thereof. This is achieved by bowling the outer regions of the inlet ducts.

Figure 12:
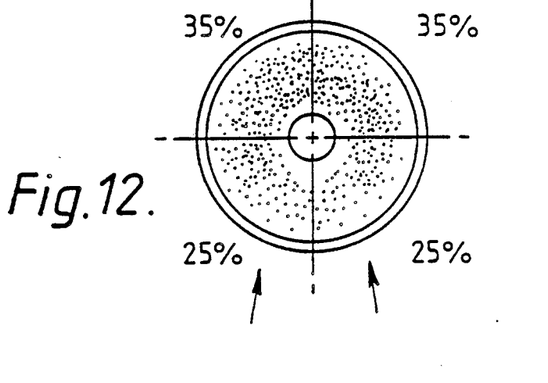
Figure 13:
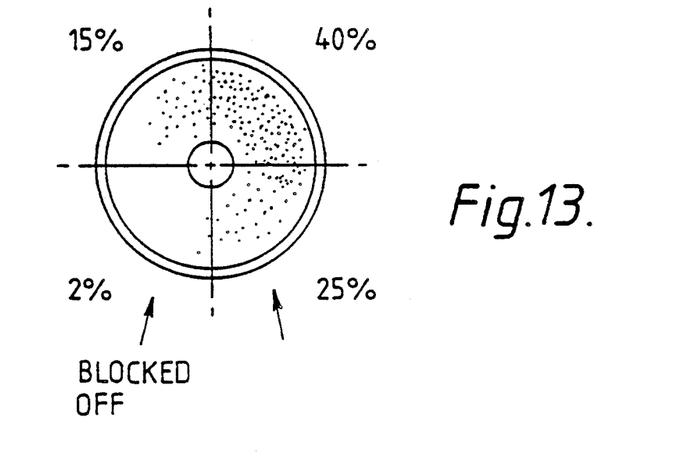

FIG. 12 shows a more even flow distribution over the entire valve head by utilizing, in addition, undercut areas at the radially inner sides of the bent portions of the inlet ducts. FIG. 13 shows how this flow is altered by blocking off one of the inlet ducts.

Although the dual duct porting systems illustrated in the drawings have been described above in relation to an induction system, it is possible that they could be also applied to an exhaust system. The venturi and the increase in cross-sectional areas of the dual ducts give favourable pressure distributions in the port and smooth gas flow around the backs of the valve producing a less turbulent flow regime and hence improving the exhausting process.

We claim:

1. A dual duct portion system for an internal combustion engine, which system comprises a pair of juxtaposed supply ducts (14,15) which merge into a single supply passage (16) formed to define a venturi section (17) and communicating with a valve port (11) with the single supply passage surrounding the stem of a poppet valve (13) associated with the valve port, characterized in that said supply ducts each comprise a bent supply duct (14,15) and in that each bent supply duct is provided with means (20,22) for creating eddies in the gas flow at a specific position along the radially inner region of the duct bend to cause a controlled breakaway of the gas flow at that position and subsequent reattachment of the gas flow with the wall of the respective supply duct or of said passage and wall portion (21) at a radially outer region of the duct bend, which portion bulges radially outwardly of the tubular envelope defining the profile of the respective supply duct.

2. A system according to claim 1, wherein said eddy creating means comprise an inwardly projecting edge (22) formed on the wall of the respective supply duct (14,15) at the radially inner side of the bend therein.

3. A system according to claim 1, wherein said eddy creating means comprise an internally undercut portion (20) formed in the wall of the respective supply duct (14,15) at or immediately after the bend therein.

4. A system according to claim 1, wherein the cross-sectional area of the pair of said supply ducts (14,15) progressively decrease in the direction towards their point of merger.

5. A system according to claim 1, wherein means are provided in at least one of said supply ducts to control the flow therethrough to permit closure or restriction thereof under lighter loading operation.

6. An internal combustion engine having a dual duct porting system according to claim 1.

7. An internal combustion engine according to claim 6, having a valve operating mechanism (30-37) that allows the valve lift to be varied.

8. An internal combustion engine according to claim 6, having a connecting rod mechanism (40-45) which is adapted to produce piston dwell after top dead centre.

* * * * *